(12) United States Patent
Inoue et al.

(10) Patent No.: US 6,667,593 B2
(45) Date of Patent: *Dec. 23, 2003

(54) ROBOT APPARATUS

(75) Inventors: Makoto Inoue, Kanagawa (JP); Taku Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/017,532

(22) Filed: Dec. 14, 2001

(65) Prior Publication Data

US 2002/0050802 A1 May 2, 2002

Related U.S. Application Data

(63) Continuation of application No. 09/457,318, filed on Dec. 8, 1999, now Pat. No. 6,337,552.

(30) Foreign Application Priority Data

Jan. 20, 1999 (JP) .......................................... 11-012292
Nov. 30, 1999 (JP) ......................................... P11-341374

(51) Int. Cl.$^7$ .............................. H02P 1/22; H02P 1/40; H02P 3/20
(52) U.S. Cl. ................................ 318/568.2; 318/568.1; 318/568.11; 318/568.12; 700/259
(58) Field of Search ................................ 318/560–696; 348/121; 700/31, 259, 248; 701/1

(56) References Cited

U.S. PATENT DOCUMENTS

| | | | |
|---|---|---|---|
| 3,888,023 A | * 6/1975 | Genin | ........................ 434/256 |
| 5,289,273 A | 2/1994 | Lang | |
| 5,832,189 A | 11/1998 | Tow | |
| 5,870,527 A | 2/1999 | Fujikawa et al. | |
| 5,929,585 A | 7/1999 | Fujita | |
| 6,038,493 A | 3/2000 | Tow | |
| 6,141,019 A | 10/2000 | Roseborough et al. | |
| 6,151,571 A | 11/2000 | Pertrushin | |
| 6,175,772 B1 | 1/2001 | Kamiya et al. | |
| 6,243,623 B1 | * 6/2001 | Takenaka et al. | ........... 700/245 |
| 6,330,494 B1 | * 12/2001 | Yamamoto | ............. 318/568.12 |
| 6,337,552 B1 | * 1/2002 | Inoue et al. | ............. 318/568.2 |
| 6,463,356 B1 | * 10/2002 | Hattori et al. | ......... 318/568.12 |

FOREIGN PATENT DOCUMENTS

| | | |
|---|---|---|
| JP | 10-328422 | 12/1998 |
| JP | 11-18 | 7/1999 |
| WO | WO-00-66 | 11/2000 |

OTHER PUBLICATIONS

Amazon.com: buying info: Tekno the Robotic Puppy. No date.
Amazon.com: buying info: Silver with Green Trim Poo–Chi Interactive Puppy. No date.
Amazon.com: buying info: Rocket the Wonder Dog: Gray. No date.
Amazon.com: buying info: 102 Dalmatians: Domino. No date.
Amazon.com: buying info: Kitty the Robotic Kitten. No date.
Amazon.com: buying info: Big Scratch & Lil Scratch. No date.

* cited by examiner

Primary Examiner—Marlon T. Fletcher
(74) Attorney, Agent, or Firm—Frommer Lawrence & Haug LLP; William S. Frommer; Dennis M. Smid

(57) ABSTRACT

The invention proposes a robot apparatus capable of autonomously performing actions in natural ways. The robot apparatus includes a control unit having emotion/-instinct models linked to the actions and deciding a next action by changing the emotion/instinct models based on the input information. A robot apparatus can be realized which autonomously behaves in accordance with the emotional and instinctive states created in itself, and hence which autonomously behaves in a natural way.

13 Claims, 8 Drawing Sheets

ROBOT APPARATUS

This is a continuation of application Ser. No. 09/457,318, filed Dec. 8, 1999 now U.S. Pat. No. 6,337,552.

BACKGROUND OF THE INVENTION

1. Field of the Invention

The present invention relates to a robot apparatus, and more particularly it is suitably applied to a pet robot performing actions like, for example, a four-footed animal.

2. Description of the Related Art

Heretofore, a four-footed walking pet robot has been proposed and developed which performs actions in predetermined ways in response to commands from a user or depending on ambient environments. Such a pet robot resembles in shape to a four-footed animal often kept in the house, such as a dog or cat. A dog-like pet robot, for example, is designed to always take a lying-down posture upon receiving a command "lie down" from the user, or to always give a "hand" (front leg) when the user stretches the hand to just under the robot nose.

However, such a conventional pet robot performs actions only in predetermined ways in accordance with commands from the user or ambient environments, and it cannot be said as a autonomous robot capable of deciding an action by itself. In other words, the conventional pet robot does not behave as with a genuine pet, and hence has a difficulty in fully satisfying such a user's demand as obtaining a pet robot as close as possible to a genuine pet.

SUMMARY OF THE INVENTION

In view of the state of art set forth above, an object of the present invention is to propose a robot apparatus capable of autonomously performing actions in natural ways.

To achieve the above object, the present invention provides a robot apparatus performing actions in accordance with input information supplied to the robot apparatus, wherein the robot apparatus includes an emotion/instinct model changing unit having emotion/-instinct models linked to the actions and deciding a next action by changing the emotion/instinct models based on the input information.

Since the robot apparatus includes the emotion/-instinct models linked to the actions and decides the next action by changing the emotion/instinct models based on the input information, the robot apparatus can autonomously behave in accordance with the emotional and instinctive states created in itself.

Also, the present invention provides a robot apparatus performing actions in accordance with input information supplied to the robot apparatus, wherein the robot apparatus includes an operating state deciding unit for deciding a next operating state subsequent to a current operating state based on both the current operating state depending on a history of the input information having been supplied in succession and the input information supplied next.

Since the next operating state subsequent to the current operating state is decided based on both the current operating state depending on a history of the input information having been supplied in succession and the input information supplied next, the robot apparatus can autonomously behave in accordance with the emotional and instinctive states created in itself.

Further, the present invention provides a robot apparatus taking postures decided based on physical configurations and mechanisms and transiting the postures in accordance with input information, wherein the robot apparatus includes a posture transition unit for changing a current posture of the robot apparatus for transition from the current posture to a posture corresponding to the input information via a predetermined route.

Since the current posture of the robot apparatus is changed for transition from the current posture to the posture corresponding to the input information via the predetermined route, the robot apparatus can be avoided from being forced to take an impossible posture or from turning over.

DESCRIPTION OF THE PREFERRED EMBODIMENTS

One embodiment of the present invention will be described below in detail with reference to the drawings.

(1) Construction of Pet Robot

Figure 1:
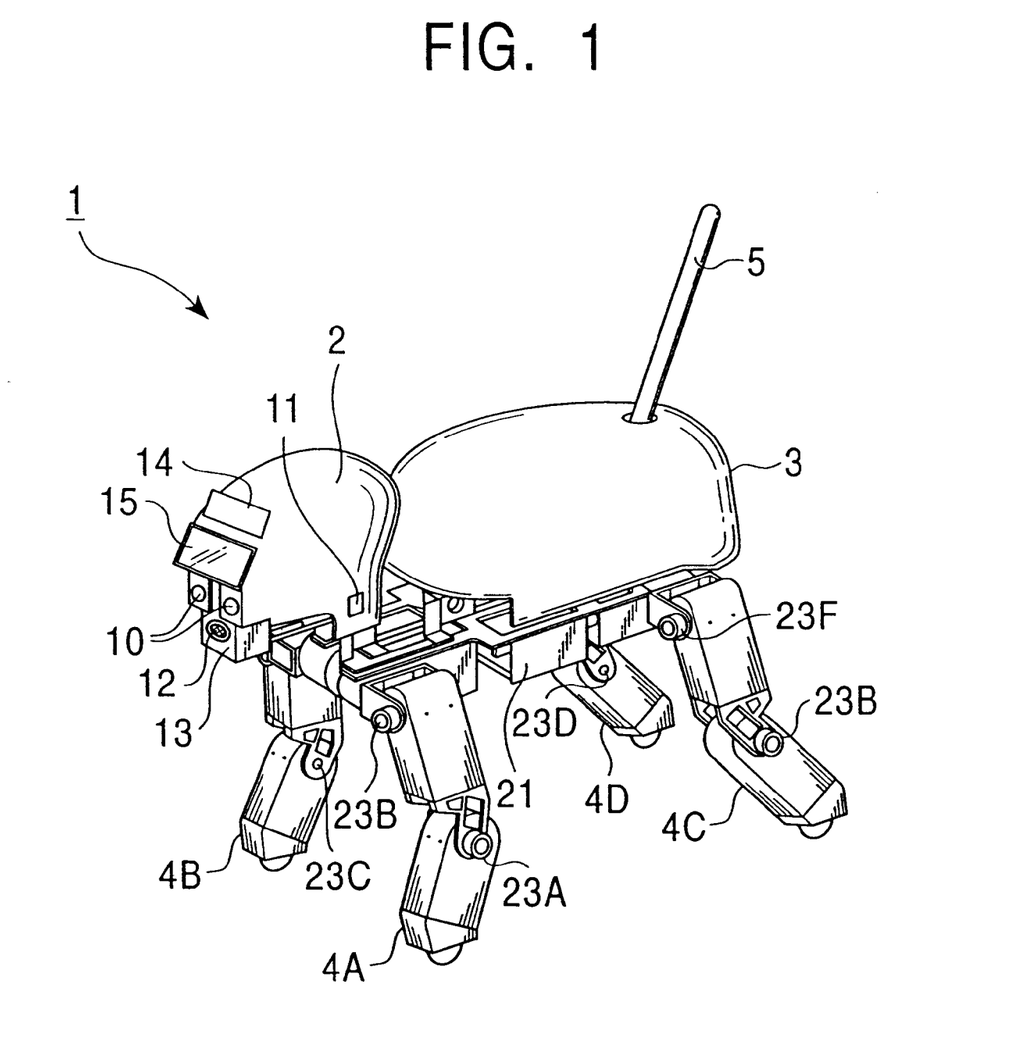
FIG. 1 is a schematic view showing one embodiment of a pet robot according to the present invention.

Referring to FIG. 1, numeral 1 denotes the entirety of a pet robot comprising a head portion 2 corresponding to the head, a body portion 3 corresponding to the body, leg portions 4A–4D corresponding to legs, and a tail portion 5 corresponding to a tail, these components being coupled into the form close to a pet. The head portion 2, the leg portions 4A–4D and the tail portion 5 are moved relative to the body portion 3 so that the pet robot behaves like a genuine four-footed animal.

The head portion 2 includes an image recognizing unit 10 which corresponds to eyes and comprises, e.g., a CCD (Charge Coupled Device) camera for picking up an image, a microphone 11 which correspond to an ear and receives a voice, and a speaker 12 which correspond to a mouth and generates a voice, these components being attached to respective predetermined positions of the head portion 2. The head portion 2 further includes a remote-controller command receiver 13 for receiving commands transmitted from a user via a remote controller (not shown), a touch sensor 14 for detecting a contact of the user's hand upon the head portion, and an image display unit 15 for displaying an image produced inside the pet robot 1.

The body portion 3 includes a battery 21 attached to a position corresponding to the belly, and an electronic circuit (not shown), etc. which are installed within the body portion 3 for controlling the entire operation of the pet robot 1.

Actuators 23A–23N are provided respectively at articulations of the legs 4A–4D, joints between the legs 4A–4D and the body portion 3, a joint between the body portion 3 and the head portion 2, a joint between the body portion 3 and the tail portion 5, etc. The actuators 23A–23N are driven under control of the electronic circuit installed within the body portion 3. The pet robot 1 is able to behave like a genuine four-footed animal by driving the actuators 23A–23N in such manners that the head portion 2 swings vertically or horizontally, it wags the tail portion 5, and the legs 4A–4D are moved to make the pet robot walk or run.

(2) Circuit Configuration of Pet Robot

Figure 2:
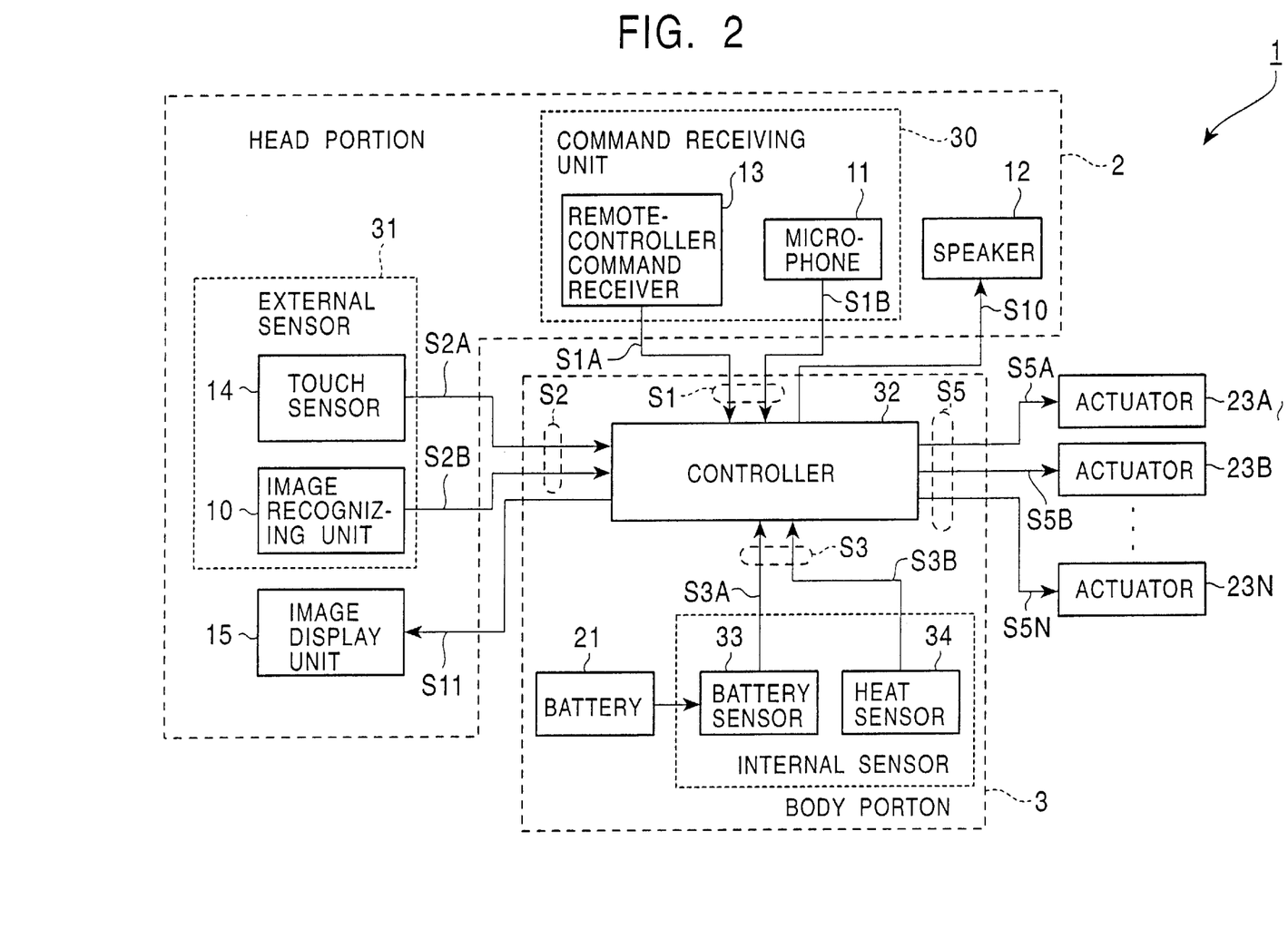
FIG. 2 is a block diagram showing a circuit configuration of the pet robot.

The circuit configuration of the pet robot 1 will now be described with reference to FIG. 2. The head portion 2 includes a command receiving unit 30 which is made up of the microphone 11 and the remote-controller command receiver 13, an external sensor 31 which is made up of the image recognizing unit 10 and the touch sensor 14, the speaker 12, and the image display unit 15. The body portion 3 includes the battery 21 attached to its lower surface, and also includes therein a controller 32 for controlling the entire operation of the pet robot 1 and an internal sensor 35 which is made up of a battery sensor 33 for detecting the remaining charge of the battery 21 and a heat sensor 34 for detecting the heat generated inside the pet robot 1. Further, the actuators 23A–23N are provided in the predetermined positions of the pet robot 1.

The command receiving unit 30 receives commands, such as "walk", "lie down" and "run after a ball", given from the user to the pet robot 1, and it is made up of the remote-controller command receiver 13 and the microphone 11. When a desired command is inputted to the remote controller (not shown) upon manipulation of the user, the remote controller transmits an infrared ray depending on the inputted command to the remote-controller command receiver 13. Upon receiving the infrared ray, the remote-controller command receiver 13 produces a reception signal S1A and transmits it to the controller 32. When the user utters a voice depending on the desired command, each microphone 11 receives the voice uttered from the user, produces a voice signal S1B, and then transmits it to the controller 32. Thus, the command receiving unit 30 produces command signals S1, i.e., the reception signal S1A and the voice signal S1B, in accordance with commands given to the pet robot 1 from the user, followed by supplying the command signals S1 to the controller 32.

The touch sensor 14 in the external sensor 31 detects actions, such as "stroking" and "striking", applied to the pet robot 1 from the user. When the user performs a desired action by touching the touch sensor 14, the touch sensor 14 produces a contact detection signal S2A depending on the applied action and transmits it to the controller 32.

The image recognizing unit 10 in the external sensor 31 recognizes the ambient environment of the pet robot 1, and detects information of the ambient environment such as "dark" and "there is a favorite toy", or motions of other pet robots such as "another pet robot is running". To this end, the image recognizing unit 10 picks up an image of surroundings of the pet robot 1 and transmits a resulting image signal S2B to the controller 32. Thus, the external sensor 31 produces external information signals S2, i.e., the contact detection signal S2A and the image signal S2B in accordance with external information given from the exterior of the pet robot 1, followed by supplying the external information signals S2 to the controller 32.

The internal sensor 35 detects the inner status of the pet robot 1 itself, such as "hungry" meaning that the battery charge is low, and "feverish". To this end, the internal sensor 35 is made up of the battery sensor 33 and the heat sensor 34.

The battery sensor 33 detects the remaining charge of the battery 21 for supplying power to various circuits in the pet robot 1, and transmits a resulting battery-charge detection signal S3A to the controller 32. The heat sensor 34 detects the heat generated inside the pet robot 1, and transmits a resulting heat detection signal S3B to the controller 32. Thus, the internal sensor 35 produces internal information signals S3, i.e., the battery-charge detection signal S3A and the heat detection signal S3B, in accordance with information on the interior of the pet robot 1, followed by supplying the internal information signals S3 to the controller 32.

The controller 32 produces control signals S5A-S5N for driving the actuators 23A–23N based on the command signals S1 supplied from the command receiving unit 30, the external information signals S2 supplied from the external sensor 31, and the internal information signals S3 supplied from the internal sensor 35. The control signals S5A-S5N are transmitted respectively to the actuators 23A–23N for driving them, whereupon the pet robot 1 is operated.

On that occasion, the controller 32 produces, as required, a voice signal S10 and an image signal S11 which are outputted to the exterior. The voice signal S10 is outputted to the exterior via the speaker 12, and the image signal S11 is transmitted to the image display unit 15 to display a desired image, thereby providing necessary information to the user.

(3) Data Processing in Controller

The data processing in the controller 32 will now be described. The controller 32 executes software data processing of the command signals S1 supplied from the command receiving unit 30, the external information signals S2 supplied from the external sensor 31, and the internal information signals S3 supplied from the internal sensor 35 in accordance with a program previously stored in a predetermined memory area. Resulting control signals S5 are supplied to the actuators 23.

Figure 3:
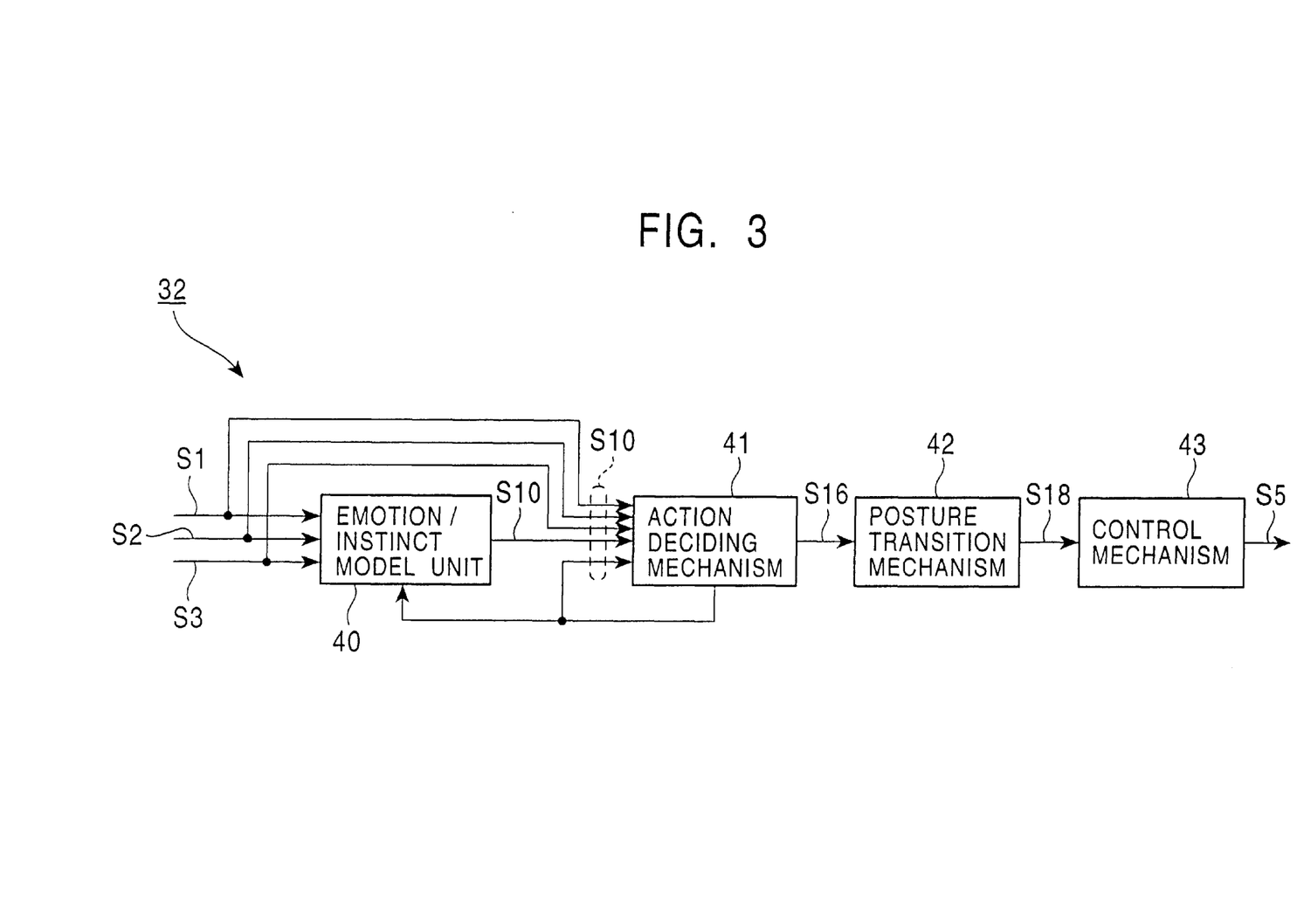
FIG. 3 is a block diagram showing data processing in a controller.

As shown in FIG. 3, details of the data processing in the controller 32 are functionally divided into an emotion/instinct model unit 40 as a means for changing an emotion/instinct model, an action deciding mechanism 41 as a means for deciding an operating state, a posture transition mechanism 42 as a posture transition means, and a control mechanism 43. The command signals S1 supplied from the exterior, the external information signals S2 and the internal information signals S3 are applied to both the emotion/instinct model unit 40 and the action deciding mechanism 41.

Figure 4:
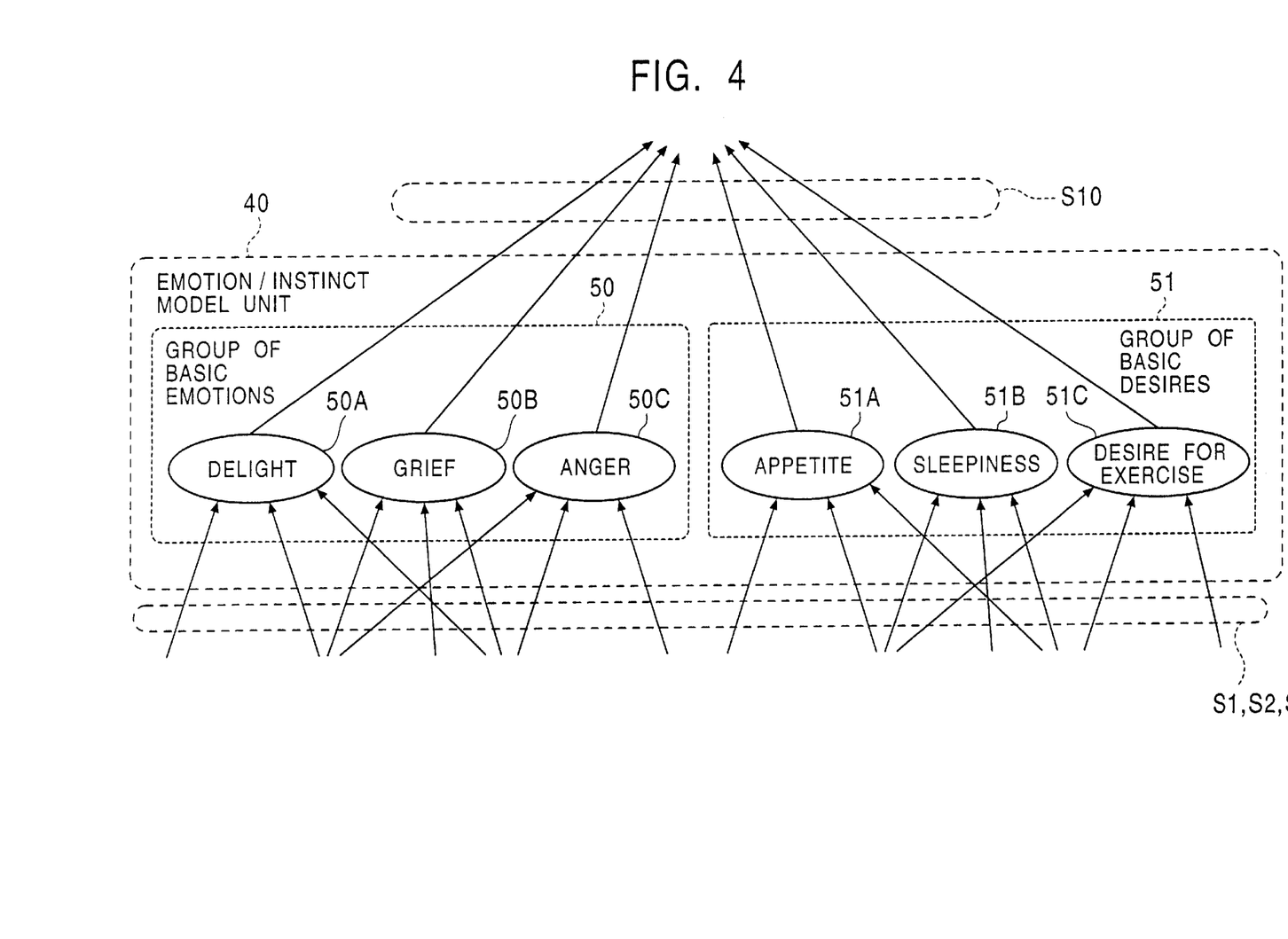
FIG. 4 is a diagram showing data processing executed by an emotion/instinct model unit.

As shown in FIG. 4, the emotion/instinct model unit 40 includes a group 50 of basic emotions comprising emotion units 50A–50C which serve as a plurality of independent emotion models, and a group 51 of basic desires comprising desire units 51A–51C which serve as a plurality of independent desire models. Of the group 50 of basic emotions, the emotion unit 50A represents "delight", the emotion unit 50B represents "grief", and the emotion unit 50C represents "anger".

Each of the emotion units 50A–50C indicates a degree of the emotion with intensity varying from 0 to 100 levels, for example, and changes the intensity of the emotion from moment to moment in accordance with the command signals S1, the external information signals S2 and the internal information signals S3 supplied to them. Thus, the emotion/instinct model unit 40 represents time-dependent changes of the emotions in a modeling manner; namely, it expresses an emotional state of the pet robot 1 by combining the momentarily varying intensities of outputs from the emotion units 50A–50C with each other.

Of the group 51 of basic desires, the desire unit 51A represents "appetite", the desire unit 51B represents "sleepiness", and the desire unit 51C represents a "desire for exercise". As with the emotion units 50A–50C, each of the desire units 51A–51C indicates a degree of the desire with intensity varying from 0 to 100 levels, for example, and changes the intensity of the desire from moment to moment in accordance with the command signals S1, the external information signals S2 and the internal information signals S3 supplied to them. Thus, the emotion/instinct model unit 40 represents time-dependent changes of the instinct desires in a modeling manner; namely, it expresses an instinctive state of the pet robot 1 by combining the momentarily varying intensities of outputs from the desire units 51A–51C with each other.

As described above, the emotion/instinct model unit 40 changes the intensities of respective outputs from the emotion units 50A–50C and the desire units 51A–51C in accordance with input information S1–S3 given by the command signals S1, the external information signals S2 and the internal information signals S3. Then, the emotion/instinct model unit 40 combines the varying intensities of outputs from the emotion units 50A–50C with each other to decide the emotional state, and combines the varying intensities of outputs from the desire units 51A–51C to decide the instinctive state. The decided emotional and instinctive states are transmitted as emotion/instinct state information S10 to the action deciding mechanism 41.

Figure 5:
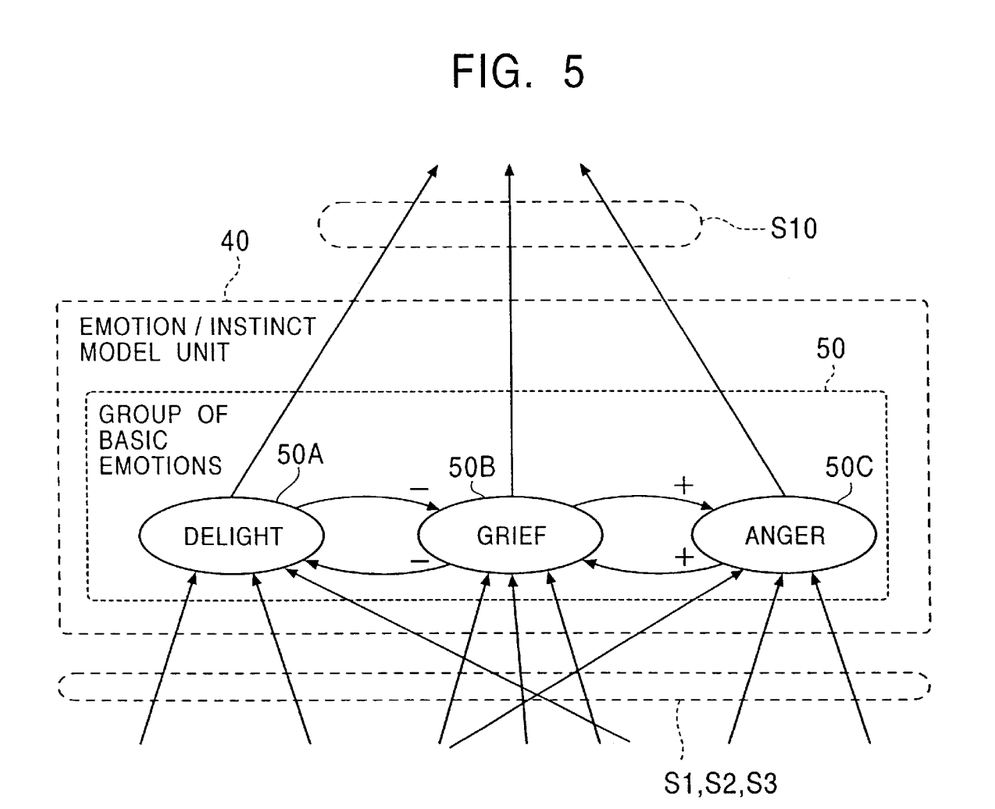
FIG. 5 is a diagram showing data processing executed by the emotion/instinct model unit.

Further, the emotion/instinct model unit 40 couples desired ones of the emotion units in the group 50 of basic emotions with each other in a mutually inhibiting or stimulating manner. When the intensity of output from one of the coupled emotion units is changed, the intensity of output from the other emotion unit is also changed correspondingly. This contributes to realizing the pet robot 1 expressing natural emotions.

More specifically, as shown in FIG. 5, the emotion/instinct model unit 40 couples the "delight" emotion unit 50A and the "grief" emotion unit 50B in a mutually inhibiting manner such that when the pet robot 1 is praised by the user, the intensity of output from the "delight" emotion unit 50A is increased and the intensity of output from the "grief" emotion unit 50B is reduced correspondingly even though the input information S1–S3 are not supplied which cause the intensity of output from the "delight" emotion unit 50A to increase and the intensity of output from the "grief" emotion unit 50B to be changed to reduce at the same time. Also, with the emotion/instinct model unit 40 coupling both the emotion units 50A and 50B, when the intensity of output from the "grief" emotion unit 50B is increased, the intensity of output from the "delight" emotion unit 50A is reduced correspondingly with an increase in the intensity of output from the "grief" emotion unit 50B.

Likewise, the emotion/instinct model unit 40 couples the "grief" emotion unit 50B and the "anger" emotion unit 50C in a mutually inhibiting manner such that when the pet robot 1 is struck by the user, the intensity of output from the "anger" emotion unit 50C is increased and the intensity of output from the "grief" emotion unit 50B is also increased correspondingly even though the input information S1–S3 are not supplied which cause the intensity of output from the "anger" emotion unit 50C to increase and the intensity of output from the "grief" emotion unit 50B to be changed to increase at the same time. Further, with the emotion/instinct model unit 40 coupling both the emotion units 50C and 50B, when the intensity of output from the "grief" emotion unit 50B is increased, the intensity of output from the "anger" emotion unit 50C is also increased correspondingly with an increase in the intensity of output from the "grief" emotion unit 50B.

In addition, as with the above-described coupling between desired ones of the emotion units 50, the emotion/instinct model unit 40 couples desired ones of the desire units in the group 51 of basic desires with each other in a mutually inhibiting or stimulating manner. When the intensity of output from one of the coupled desire units is changed, the intensity of output from the other desire unit is also changed correspondingly. This contributes to realizing the pet robot 1 expressing natural instincts.

Returning to FIG. 3, the emotion/instinct model unit 40 is supplied with behavior information S12 indicating the nature of current or past action of the pet robot 1 itself, such as "it is walking for a long time", from the action deciding mechanism 41 in the downstream stage. Depending on the action of the pet robot 1 indicated by the behavior information S12, therefore, the emotion/-instinct model unit 40 produces different contents of the emotion/instinct state information S10 even with the same input information S1–S3 applied.

Figure 6:
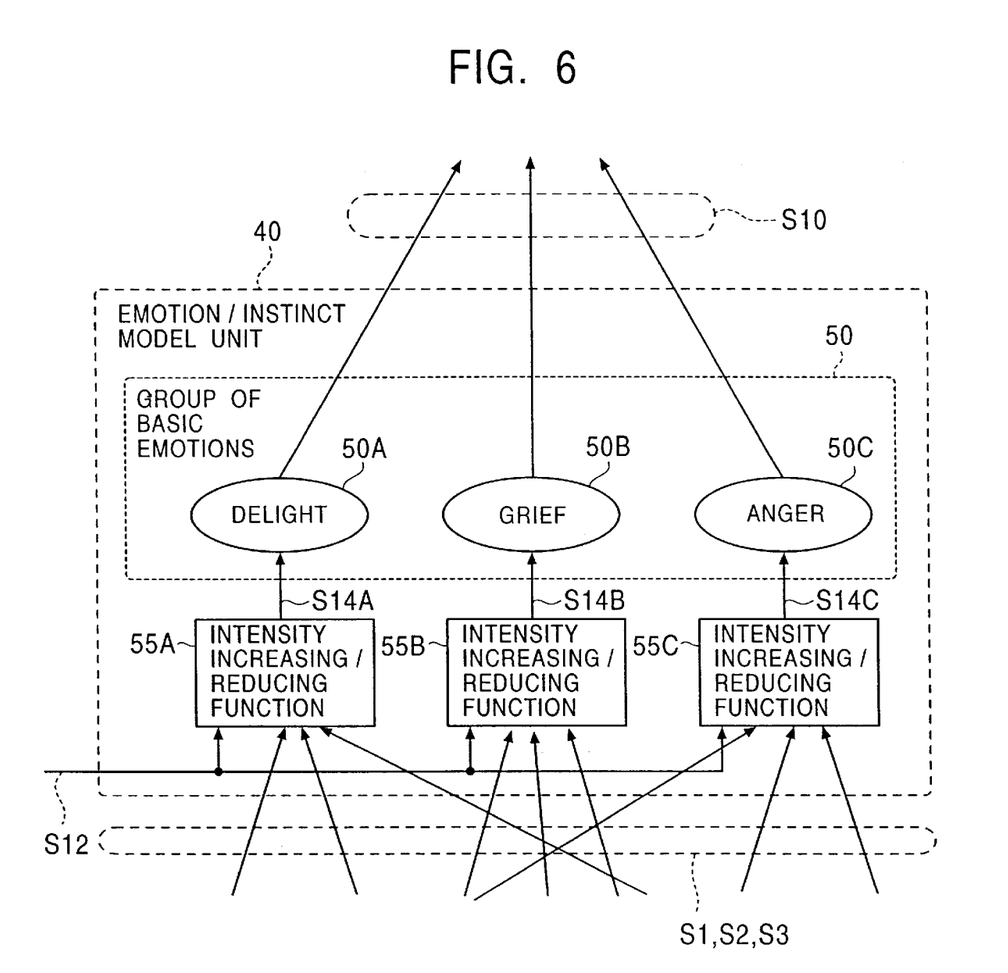
FIG. 6 is a diagram showing data processing executed by the emotion/instinct model unit.

Concretely, as shown in FIG. 6, the emotion/instinct model unit 40 includes intensity increasing/reducing functions 55A–55C which are disposed upstream of the emotion units 50A–50C, respectively, for increasing and reducing the intensities of outputs from the emotion units 50A–50C based on the behavior information S12 indicating the action of the pet robot 1, as well as the input information S1–S3. Then, the intensities of outputs from the emotion units 50A–50C are increased and reduced in accordance with intensity information S14A-S14C outputted from the intensity increasing/reducing functions 55A–55C, respectively.

For example, when the pet robot 1 greets the user and the user strokes the head of the pet robot 1, i.e., when the behavior information S12 indicating "the pet robot 1 greets the user" and the input information S1–S3 indicating "the user strokes the head of the pet robot 1" are both applied to the intensity increasing/reducing function 55A, the emotion/instinct model unit 40 increases the intensity of output from the "delight" emotion unit 50A. However, when the user strokes the head of the pet robot 1 while the pet robot 1 is doing some work or task, i.e., when the behavior information S12 indicating "the pet robot 1 is doing some work" and the input information S1–S3 indicating "the user strokes the head of the pet robot 1" are both applied to the intensity increasing/-reducing function 55A, the emotion/instinct model unit 40 does not change the intensity of output from the "delight" emotion unit 50A.

Thus, the emotion/instinct model unit 40 decides the intensities of respective outputs from the emotion units 50A–50C while referring to not only the input information S1–S3 but also the behavior information S12 indicating the current or past action of the pet robot 1. Accordingly, for example, when the user strokes the head of the pet robot 1 out of mischief while the pet robot 1 is doing some task, it is possible to prevent an increase in the intensity of output from the "delight" emotion unit 50A and to avoid the pet robot 1 from expressing unnatural emotion of delight. Similarly, for the desire units 51A–51C, the emotion/instinct model unit 40 also increases and reduces the intensities of respective outputs from the desire units 51A–51C in accordance with not only the input information S1–S3 but also the behavior information S12 supplied thereto.

As described above, upon receiving the input information S1–S3 and the behavior information S12, the intensity increasing/reducing functions 55A–55C produce and output intensity information S14A-S14C depending on preset parameters. By presetting the parameters to different values from one pet robot to another, the pet robots can be given individual characteristics, e.g., one pet robot being irritable and another pet robot being cheerful.

Returning to FIG. 3, the action deciding mechanism 41 decides a next action based on input information S14 given by the command signals S1, the external information signals S2, the internal information signals S3, the emotion/instinct state information S10, and the behavior information S12, and then transmits the contents of the decided action, as action command information S16, to the posture transition mechanism 42.

Figure 7:
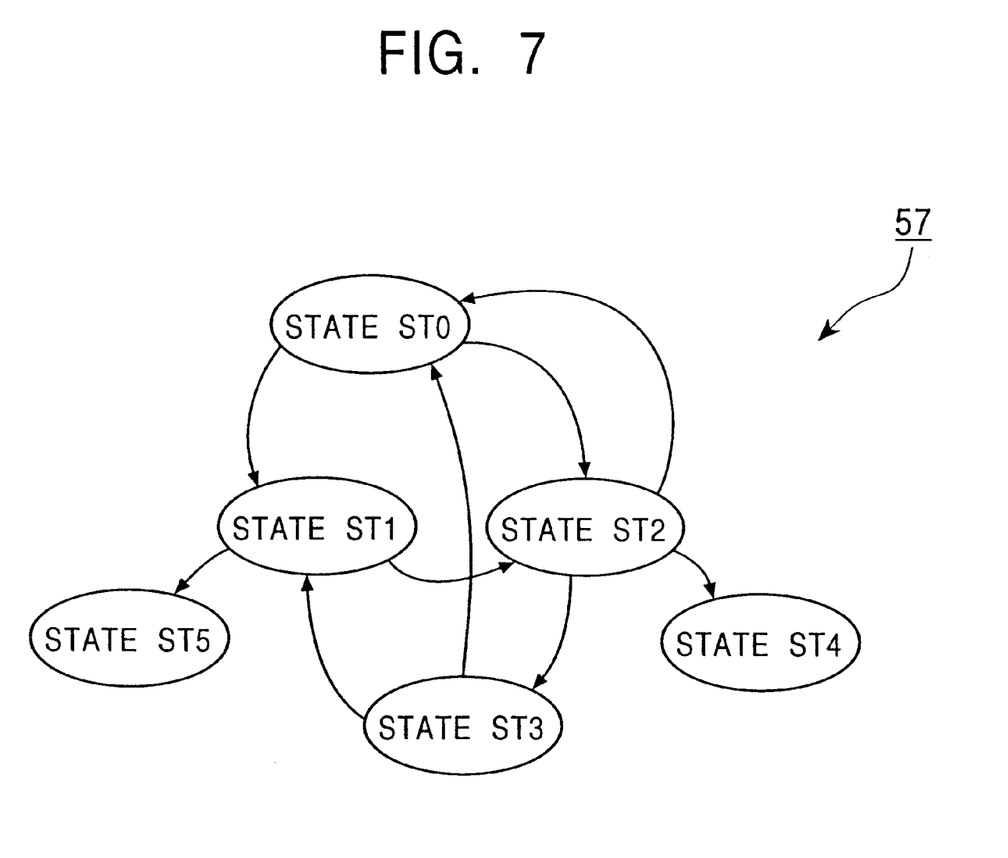
FIG. 7 is a state transition diagram of a finite automaton in an action deciding mechanism.

More specifically, as shown in FIG. 7, the action deciding mechanism 41 employs an algorithm called a finite automaton 57 having a finite number of states, wherein a history of the input information S14 supplied in the past is represented by operating states (hereinafter referred to as States), and the current State is transited to the next State based on both the currently supplied input information S14 and the current State, thereby deciding the next action. Thus, the action deciding mechanism 41 transits the State each time the input information S14 is supplied, and decides the next action depending on the transited State; namely, it decides the next action by referring to not only the current input information S14 and the past input information S14.

Accordingly, for example, if the input information S14 indicating "the ball has disappeared" is supplied when a State ST1 indicating "pet robot is running after a ball" is the current State, transition to a State ST5 indicating "standing" follows. On the other hand, if the input information S14 indicating "stand up" is supplied when a State ST2 indicating "lying" is the current State, transition to a State ST4 indicating "standing" follows. It is thus understood that the States ST4 and ST5 indicate the same action, but differ from each other because of a difference in history of the input information S14 in the past.

In practice, upon detecting a predetermined trigger, the action deciding mechanism 41 effects transition from the current State to the next State. Concretely, a trigger is provided by, for example, the fact that a period of time during which the action in the current State continues has reached a certain value, or that the particular input information S14 is applied, or that the intensity of output from a desired one of the emotion units 50A–50C and the desire units 51A–51C whose output intensities are represented by the emotion/instinct state information S10 supplied from the emotion/instinct model unit 40 has exceeded a predetermined threshold.

On that occasion, based on whether the intensity of output from a desired one of the emotion units 50A–50C and the desire units 51A–51C whose output intensities are represented by the emotion/instinct state information S10 supplied from the emotion/instinct model unit 40 has exceeded the predetermined threshold, the action deciding mechanism 41 selects the State to be transited. In other words, even with the same command signals S1 applied, for example, the action deciding mechanism 41 effects transition to the different States depending on the intensities of outputs from the emotion units 50A–50C and the desire units 51A–51C.

Accordingly, for example, upon detecting based on the external information signals S2 that the user's hand is stretched to just under the robot nose, detecting based on the emotion/instinct state information S10 that the intensity of output from the "anger" emotion unit 50C is not greater than the predetermined threshold, and detecting based on the internal information signals S3 that "the pet robot is not hungry", i.e., that the battery voltage is not lower than a predetermined threshold, the action deciding mechanism 41 produces the action command information S16 causing the pet robot to "give the hand" in response to the user's hand being stretched to just under the robot nose, and then transmits it to the posture transition mechanism 42.

Also, for example, upon detecting that the user's hand is stretched to just under the robot nose, detecting that the intensity of output from the "anger" emotion unit 50C is not greater than the predetermined threshold, and detecting that "the pet robot is hungry", i.e., that the battery voltage is lower than the predetermined threshold, the action deciding mechanism 41 produces the action command information S16 causing the pet robot to "lick the user's hand", and then transmits it to the posture transition mechanism 42.

Further, for example, upon detecting that the user's hand is stretched to just under the robot nose, and detecting that the intensity of output from the "anger" emotion unit 50C is greater than the predetermined threshold, the action deciding mechanism 41 produces the action command information S16 causing the pet robot to "turn the head sideways in a huff" regardless of whether "the pet robot is not hungry", i.e., whether the battery voltage is not lower than the predetermined threshold, and then transmits the action command information S16 to the posture transition mechanism 42.

Moreover, in accordance with the intensity of output from a desired one of the emotion units 50A–50C and the desire units 51A–51C whose output intensities are represented by the emotion/instinct state information S10 supplied from the emotion/instinct model unit 40, the action deciding mechanism 41 decides the magnitude of one or more parameters for the action performed in the transited State, e.g., the speed of walking, the stroke and speed of motions of the hand and legs, and the pitch and loudness of sounds uttered, and then produces the action command information S16 depending on the parameters for the action, followed by transmitting it to the posture transition mechanism 42.

Additionally, the input information S1–S3 given by the command signals S1, the external information signals S2 and the internal information signals S3 are applied to both the emotion/instinct model unit 40 and the action deciding mechanism 41 because the contents of the input information are different depending on the timing at which those signals are applied to the emotion/instinct model unit 40 and the action deciding mechanism 41.

For example, when the external information signals S2 indicating "the user strokes the head" are supplied, the controller 32 causes the emotion/instinct model unit 40 to produce the emotion/instinct state information S10 indicating "delight", and then supplies the produced emotion/instinct state information S10 to the action deciding mechanism 41. At this moment, if the external information signals S2 indicating "there is the user's hand just under the robot nose" are supplied, the controller 32 causes the action deciding mechanism 41 to produce the action command information S16 instructing "the pet robot gives the hand with joy", based on both the emotion/instinct state information S10 indicating "delight" and the external information signals S2 indicating "there is the user's hand just under the robot nose", followed by transmitting the action command information S16 to the posture transition mechanism 42.

Returning to FIG. 3 again, the posture transition mechanism 42 produces posture transition information S18 for transition from the current posture to the next posture based on the action command information S16 supplied from the action deciding mechanism 41, and then transmits the posture transition information S18 to the control mechanism 43. On that occasion, the next posture capable of being transited from the current state is decided depending on physical features of the pet robot 1 such as the shapes and weights of the body, hands and legs, including joint manners between them, and on mechanisms of the actuators 24A–23N such as the directions and angles in and over which the articulations are bendable.

Here, the transition-enable postures are grouped into postures capable of being directly transited from the current state and postures incapable of being directly transited from the current state. For example, the four-footed pet robot 1 can directly transit from the posture lying sprawled to the posture lying down, but cannot directly transit from the posture lying sprawled to the stand-up posture. The latter transition requires two-step motions, i.e., a first step of drawing the hands and legs near the body to take the posture lying down, and a second step of standing up from the posture lying down. Also, there are postures which the pet robot cannot take with safety. For example, the four-footed pet robot 1 turns over easily when attempting to raise both the hands for cheering from the stand-up posture.

In view of the above, the postures capable of being directly transited are registered beforehand in the posture transition mechanism 42. When the action command information S16 supplied from the action deciding mechanism 41 indicates the posture capable of being directly transited, the posture transition mechanism 42 transmits that action command information S16, as the posture transition information S18, to the control mechanism 43. On the other hand, when the action command information S16 supplied from the action deciding mechanism 41 indicates the posture incapable of being directly transited, the posture transition mechanism 42 produces the posture transition information S18 for effecting transition to the target posture after transition to another posture capable of being directly transited, and then transmits the produced posture transition information S18 to the control mechanism 43. By employing such two-step motions, the pet robot 1 is avoided from being forced to take the posture incapable of being transited, or from turning over because of posture transition beyond its ability.

Figure 8:
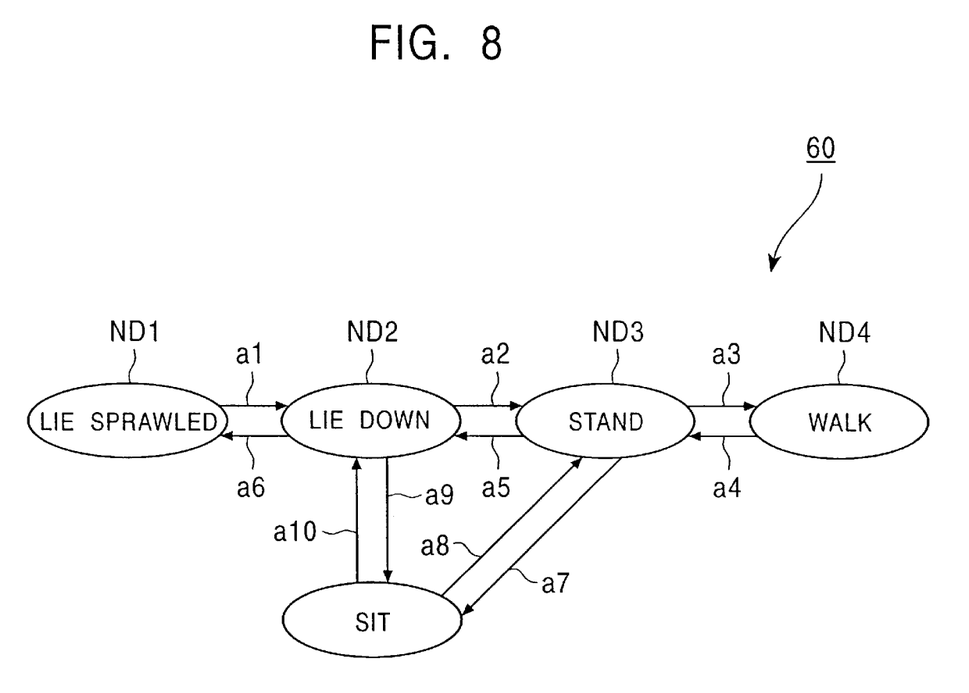
FIG. 8 is a posture transition diagram for a posture deciding mechanism.

Concretely, in the posture transition mechanism 42, the postures capable of being taken by the pet robot 1 are registered beforehand, and the relations between every two postures capable of being transited from one to the other are recorded. As shown in FIG. 8, for example, the posture transition mechanism 42 employs an algorithm called a directional graph 60 in which the postures capable of being taken by the pet robot 1 are represented by nodes ND1–ND5, and every two postures capable of being transited from one to the other among the nodes ND1–ND5 are coupled by directional arcs a1–a10.

When the action command information S16 is supplied from the action deciding mechanism 41, the posture transition mechanism 42 plans such a posture transition schedule that the node ND corresponding to the current posture is coupled to the node ND which is represented by the action command information S16 and corresponds to the posture to be taken next, by searching a route leading from the current node ND to the next node ND following the direction indicated by each directional arc a, and by recording the nodes ND positioned on the searched route in order. As a result, the pet robot 1 can realize the action instructed by the action deciding mechanism 41 while it is avoided from being forced to take the posture incapable of being transited, or from turning over because of posture transition beyond its ability.

Assuming now, for example, that the current posture corresponds to the node ND2 indicating the "lying-down" posture, when the action command information S16 indicating "sit down" is supplied, the posture transition mechanism 42 supplies the posture transition information S18 indicating "sit down" to the control mechanism 43 upon determining that it is allowed to directly transit from the node ND2 indicating the "lying-down" posture to the node ND5 indicating the "sitting" posture. On the other hand, when the action command information S16 indicating "walk" is supplied, the posture transition mechanism 42 plans a posture transition schedule by searching a route leading from the node ND2 indicating the "lying-down" posture to the node ND4 indicating the "walking" posture, and then produces the posture transition information S18 first instructing "stand up" and thereafter instructing "walk", followed by transmitting the produced posture transition information S18 to the control mechanism 43.

Returning to FIG. 3 again, the control mechanism 43 produces the control signals S5 for driving the actuators 23 based on the posture transition information S18, and then transmits the produced control signals S5 to the actuators 23. The actuators 23 are thereby driven to operate the pet robot 1 in a desired manner.

(4) Operation and Advantages

In the above construction, the emotion/instinct model unit 40 in the controller 32 changes the emotional and instinctive states of the pet robot 1 based on the input information S1–S3 supplied thereto, so that such changes of the emotional and instinctive states are reflected upon the action of the pet robot 1. This enables the pet robot 1 to autonomously behave in accordance with the emotional and instinctive states created in itself.

The action deciding mechanism 41 in the controller 32 decides the next State subsequent to the current State based on both the current State depending on a history of the input information S14 having been supplied in succession and the input information S14 supplied next. This also contributes to enabling the pet robot 1 to autonomously behave in accordance with the emotional and instinctive states created in itself.

The posture transition mechanism 42 in the controller 32 changes the current posture of the pet robot 1 for transition from the current posture to the posture corresponding to the action command information S16 via a predetermined route. The pet robot 1 is thereby avoided from being forced to take an impossible posture or from turning over.

With the above construction, the emotional and instinctive states of the pet robot 1 are changed based on the input information S1–S3 supplied to the controller 32, and the action of the pet robot 1 is decided based on such changes of the emotional and instinctive states. The posture capable of being transited is selected depending on the decided action to operate the pet robot 1 so that it autonomously behaves in accordance with the emotional and instinctive states created in itself. As a result, the pet robot 1 behaving very like a genuine pet can be realized.

(5) Other Embodiments

While the above embodiment has been described in connection with the case of receiving the user's commands transmitted from the remote controller in the form of infrared rays, the present invention is not limited to that case. For example, the user's commands may be transmitted in the form of electrical waves or sound waves.

Also, while the above embodiment has been described in connection with the case of receiving the user's commands via the command receiving unit 30 made up of the remote-controller command receiver 13 and the microphone 11, the present invention is not limited to that case. For example, a computer may be connected to the pet robot 1 and the user's commands may be received via the connected computer.

Furthermore, while the above embodiment has been described in connection with the case of deciding the emotional and instinctive states using the emotion units 50A–50C indicating three kinds of emotions, i.e., "delight", "grief" and "anger", and the desire units 51A–51C indicating three kinds of desires, i.e., "appetite", "sleepiness" and a "desire for exercise", the present invention is not limited to that case. For example, an emotion unit indicating "loneliness" may be added to the emotion units 50A–50C, or a desire units indicating a "desire for affection" may be added to the desire units 51A–51C. Stated otherwise, the emotional and instinctive states may be decided by a combination including other various kinds of emotion units and desire units in any other suitable number than described above.

While the above embodiment has been described in connection with the case of deciding the next action by the action deciding mechanism 41 based on the command signals S1, the external information signals S2, the internal information signals S3, the emotion/instinct state information S10, and the behavior information S12, the present invention is not limited to that case. The next action may be decided based on a part of the command signals S1, the external information signals S2, the internal information signals S3, the emotion/instinct state information S10, and the behavior information S12.

While the above embodiment has been described in connection with the case of deciding the next action by employing an algorithm called the finite automaton 57, the present invention is not limited to that case. The next action may be decided by employing an algorithm called a State machine in which the number of States is not finite. In that case, a new State is produced each time the input information 14 is supplied, and the next action is decided depending on the produced State.

While the above embodiment has been described in connection with the case of deciding the next action by employing an algorithm called the finite automaton 57, the present invention is not limited to that case. The next action may be decided by employing an algorithm called a probability finite automaton in which a plurality of States are selected as candidates for the destination of transition based on both the input information S14 currently supplied and the State at that time, and a desired one of the plurality of States selected as the destination candidates is decided at random by using random numbers.

Moreover, the above embodiment has been described in connection with the case that when the action command information S16 indicates the posture capable of being directly transited, that action command information S16 is transmitted, as the posture transition information S18, to the control mechanism 43, but when the action command information S16 indicates the posture incapable of being directly transited, the posture transition information S18 for effecting transition to the target posture after transition to another posture capable of being directly transited is produced and transmitted to the control mechanism 43. However, the present invention is not limited to that case. As an alternative, only when the action command information S16 indicates the posture capable of being directly transited, that action command information S16 may be accepted and transmitted to the control mechanism 43, but when the action command information S16 indicates the posture incapable of being directly transited, that action command information S16 may be rejected.

Additionally, while the above embodiment has been described in connection with the case of applying the present invention to the pet robot 1, the present invention is not limited to that case. For example, the present invention is also applicable to other various robot apparatuses such as those robot apparatuses which are employed in the fields of games and exhibitions for the purpose of entertainment.

According to the present invention, as described above, since a robot apparatus includes emotion/instinct models linked to an action and decides the next action by changing the emotion/instinct models based on the input information, the robot apparatus can autonomously behave in accordance with the emotional and instinctive states created in itself. As a result, a robot apparatus autonomously behaving in a natural way can be realized.

Since the next operating state subsequent to the current operating state is decided based on both the current operating state depending on a history of the input information having been supplied in succession and the input information supplied next, the robot apparatus can autonomously behave in accordance with the emotional and instinctive states created in itself. As a result, a robot apparatus autonomously behaving in a natural way can be realized.

Since the current posture of the robot apparatus is changed for transition from the current posture to the posture corresponding to the input information via a predetermined route, the robot apparatus can be avoided from being forced to take an impossible posture or from turning over. As a result, a robot apparatus autonomously behaving in a natural way can be realized.

What is claimed is:

1. A method usable with a robot apparatus, said method comprising the steps of:

detecting, by use of a sensor, an input signal supplied to said robot apparatus from at least one of an external stimulus and an internal stimulus;

determining at least one semantic content in accordance with the detected input signal;

generating, by use of an instinct model, at least one parameter defining a predetermined instinct;

changing at least one instinct parameter based upon the semantic content by use of a changing means; and deciding, by use of a behavior model, a next action or behavior based upon at least one of a current state and a last state;

wherein said behavior model decides an action or behavior in accordance with the instinct parameter, and said changing means changes said at least one instinct parameter based upon said decided action or behavior.

2. A method usable with a robot apparatus, said method comprising the steps of:

detecting, by use of a sensor, an input signal supplied to said robot apparatus from at least one of an external stimulus and an internal stimulus;

determining at least one semantic content in accordance with the detected input signal;

generating, by use of an emotion model, at least one parameter defining a predetermined emotion;

changing at least one emotion parameter based upon the semantic content by use of a changing means; and deciding, by use of a behavior model, a next action or behavior based upon at least one of a current state and a last state;

wherein said behavior model decides an action or behavior in accordance with the emotion parameter, and said changing means changes said at least one emotion parameter based upon said decided action or behavior.

3. A method for use with a robot apparatus having a portion, said method comprising the steps of:
   providing a posture transition model including states of a posture between which transition is allowed;
   controlling said portion by use of a control means;
   detecting, by use of a sensor, an input signal supplied to said robot apparatus from at least one of an external stimulus and an internal stimulus;
   determining at least one semantic content in accordance with the detected input signal;
   generating, by use of an instinct model, at least one parameter defining a predetermined instinct;
   changing at least one instinct parameter based upon the semantic content by use of an instinct changing means;
   deciding, by use of a behavior model, a next action or behavior based upon at least one of a current state and a last state;
   generating, by use of an emotion model, at least one parameter defining a predetermined emotion; and
   changing, by use of an emotion changing means, at least one emotion parameter based upon the semantic content;
   wherein said control means controls said portion based upon said posture transition model in order to have said robot generate behavior or perform actions, and
   wherein said behavior model decides an action or behavior in accordance with at least one of the instinct parameter and the emotion parameter, and said instinct changing means changes said at least one instinct parameter and said emotion changing means changes said at least one emotion parameter based upon said decided action or behavior.

4. A computer program usable with a robot apparatus, said program comprising:
   an instruction for detecting, by use of a sensor, an input signal supplied to said robot apparatus from at least one of an external stimulus and an internal stimulus;
   an instruction for determining at least one semantic content in accordance with the detected input signal;
   an instruction for generating, by use of an instinct model, at least one parameter defining a predetermined instinct;
   an instruction for changing at least one instinct parameter based upon the semantic content by use of a changing means; and
   an instruction for deciding, by use of a behavior model, a next action or behavior based upon at least one of a current state and a last state;
   wherein said behavior model decides an action or behavior in accordance with the instinct parameter, and said changing means changes said at least one instinct parameter based upon said decided action or behavior.

5. A computer program usable with a robot apparatus, said program comprising:
   an instruction for detecting, by use of a sensor, an input signal supplied to said robot apparatus from at least one of an external stimulus and an internal stimulus;
   an instruction for determining at least one semantic content in accordance with the detected input signal;
   an instruction for generating, by use of an emotion model, at least one parameter defining a predetermined emotion;
   an instruction for changing at least one emotion parameter based upon the semantic content by use of a changing means; and
   an instruction for deciding, by use of a behavior model, a next action or behavior based upon at least one of a current state and a last state;
   wherein said behavior model decides an action or behavior in accordance with the emotion parameter, and said changing means changes said at least one emotion parameter based upon said decided action or behavior.

6. A computer program for use with a robot apparatus having a portion, said program comprising:
   an instruction for providing a posture transition model including states of a posture between which transition is allowed;
   an instruction for controlling said portion by use of a control means;
   an instruction for detecting, by use of a sensor, an input signal supplied to said robot apparatus from at least one of an external stimulus and an internal stimulus;
   an instruction for determining at least one semantic content in accordance with the detected input signal;
   an instruction for generating, by use of an instinct model, at least one parameter defining a predetermined instinct;
   an instruction for changing at least one instinct parameter based upon the semantic content by use of an instinct changing means;
   an instruction for deciding, by use of a behavior model, a next action or behavior based upon at least one of a current state and a last state;
   an instruction for generating, by use of an emotion model, at least one parameter defining a predetermined emotion; and
   an instruction for changing, by use of an emotion changing means, at least one emotion parameter based upon the semantic content;
   wherein said control means controls said portion based upon said posture transition model in order to have said robot generate behavior or perform actions, and
   wherein said behavior model decides an action or behavior in accordance with at least one of the instinct parameter and the emotion parameter, and said instinct changing means changes said at least one instinct parameter and said emotion changing means changes said at least one emotion parameter based upon said decided action or behavior.

7. A medium having stored therein a computer program for use with a robot apparatus having a portion, said program comprising an instruction for providing a posture transition model including states of a posture between which transition is allowed and an instruction for controlling said portion based upon said posture transition model in order to have said robot generate behavior or perform actions.

8. The medium according to claim 7, wherein said posture transition model comprises a first node indicative of a first posture of said robot apparatus, a second node indicative of a second posture of said robot apparatus, and an arc indicative of capable transitioning directly from said first node to said second node.

9. The medium according to claim 7, wherein said posture transition model transits postures by employing a directional graph in which a plurality of nodes representing postures capable of being taken by said robot apparatus are registered beforehand, and every two among the postures capable of being directly transited from one to the other are coupled by a directional arc.

10. The medium according to claim 7, wherein said posture transition model plans a posture transition schedule by searching a route from a node corresponding to the current posture to a next node while following a direction indicated by each respective directional arc.

11. A medium having stored therein a computer program usable with a robot apparatus, said program comprising:
   an instruction for detecting, by use of a sensor, an input signal supplied to said robot apparatus from at least one of an external stimulus and an internal stimulus;
   an instruction for determining at least one semantic content in accordance with the detected input signal;
   an instruction for generating, by use of an instinct model, at least one parameter defining a predetermined instinct;
   an instruction for changing at least one instinct parameter based upon the semantic content by use of a changing means; and
   an instruction for deciding, by use of a behavior model, a next action or behavior based upon at least one of a current state and a last state;
   wherein said behavior model decides an action or behavior in accordance with the instinct parameter, and said changing means changes said at least one instinct parameter based upon said decided action or behavior.

12. A medium having stored therein a computer program usable with a robot apparatus, said program comprising:
   an instruction for detecting, by use of a sensor, an input signal supplied to said robot apparatus from at least one of an external stimulus and an internal stimulus;
   an instruction for determining at least one semantic content in accordance with the detected input signal;
   an instruction for generating, by use of an emotion model, at least one parameter defining a predetermined emotion;
   an instruction for changing at least one emotion parameter based upon the semantic content by use of a changing means; and
   an instruction for deciding, by use of a behavior model, a next action or behavior based upon at least one of a current state and a last state;
   wherein said behavior model decides an action or behavior in accordance with the emotion parameter, and said changing means changes said at least one emotion parameter based upon said decided action or behavior.

13. A medium having stored therein a computer program for use with a robot apparatus having a portion, said program comprising:
   an instruction for providing a posture transition model including states of a posture between which transition is allowed;
   an instruction for controlling said portion by use of a control means;
   an instruction for detecting, by use of a sensor, an input signal supplied to said robot apparatus from at least one of an external stimulus and an internal stimulus;
   an instruction for determining at least one semantic content in accordance with the detected input signal;
   an instruction for generating, by use of an instinct model, at least one parameter defining a predetermined instinct;
   an instruction for changing at least one instinct parameter based upon the semantic content by use of an instinct changing means;
   an instruction for deciding, by use of a behavior model, a next action or behavior based upon at least one of a current state and a last state;
   an instruction for generating, by use of an emotion model, at least one parameter defining a predetermined emotion; and
   an instruction for changing, by use of an emotion changing means, at least one emotion parameter based upon the semantic content;
   wherein said control means controls said portion based upon said posture transition model in order to have said robot generate behavior or perform actions, and
   wherein said behavior model decides an action or behavior in accordance with at least one of the instinct parameter and the emotion parameter, and said instinct changing means changes said at least one instinct parameter and said emotion changing means changes said at least one emotion parameter based upon said decided action or behavior.

* * * * *